United States Patent [19]
Davis

[11] 3,965,752
[45] June 29, 1976

[54] BALANCING DEVICE FOR VEHICLE WHEELS

[76] Inventor: Commodore Davis, Rte. No. 1, Box 289, Big Pine Key, Fla. 33043

[22] Filed: Oct. 16, 1975

[21] Appl. No.: 622,894

[52] U.S. Cl. ............................................. 73/457
[51] Int. Cl.² ........................................ G01M 1/28
[58] Field of Search ............ 73/457, 458, 462, 464, 73/66

[56] References Cited
UNITED STATES PATENTS
3,815,425   6/1974   Skidmore ............................. 73/457
FOREIGN PATENTS OR APPLICATIONS
559,712   4/1960   Belgium ................................ 73/462

*Primary Examiner*—James J. Gill

[57] ABSTRACT

A device for balancing a wheel mounted on a vehicle wherein the device is put in contact with the wheel by means of an adaptor cap which replaces the dust cap on the end of the wheel spindle. The wheel is driven at a high rate of speed with a probe centered relative to the end of said wheel spindle. When the heavy portion of the out-of-balance wheel moves up past true center, the probe actuates an electric switch by means of a rotor shaft, axially aligned with said probe, to complete an electric circuit to at least one indicator light of a first set of lights by means of a brush contact, fixed to the rotor shaft, for sequential engagement with a plurality of annularly disposed rotor plates. The last light to be illuminated of said first set indicates the exact location of the heavy portion. Simultaneously, a pivotal switch arm is swung across a plurality of contacts to sequentially complete second circuits to corresponding indicator lights of a second set, the last light illuminated indicates the exact amount of weight to be fixed relative to the light portion of the wheel.

16 Claims, 7 Drawing Figures

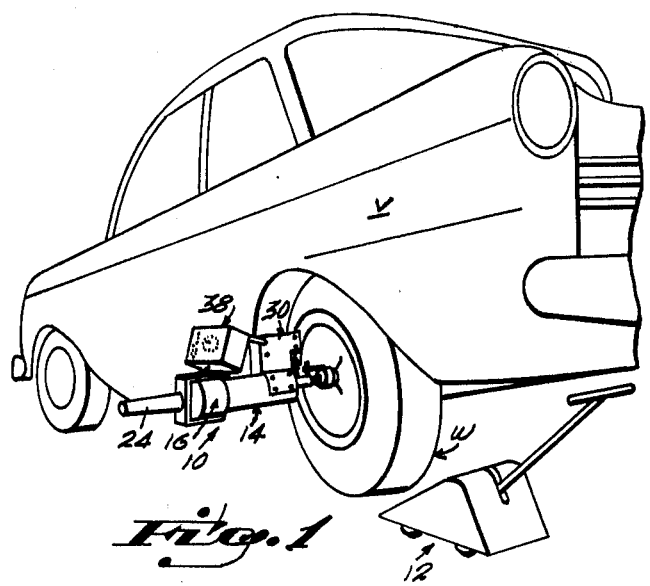
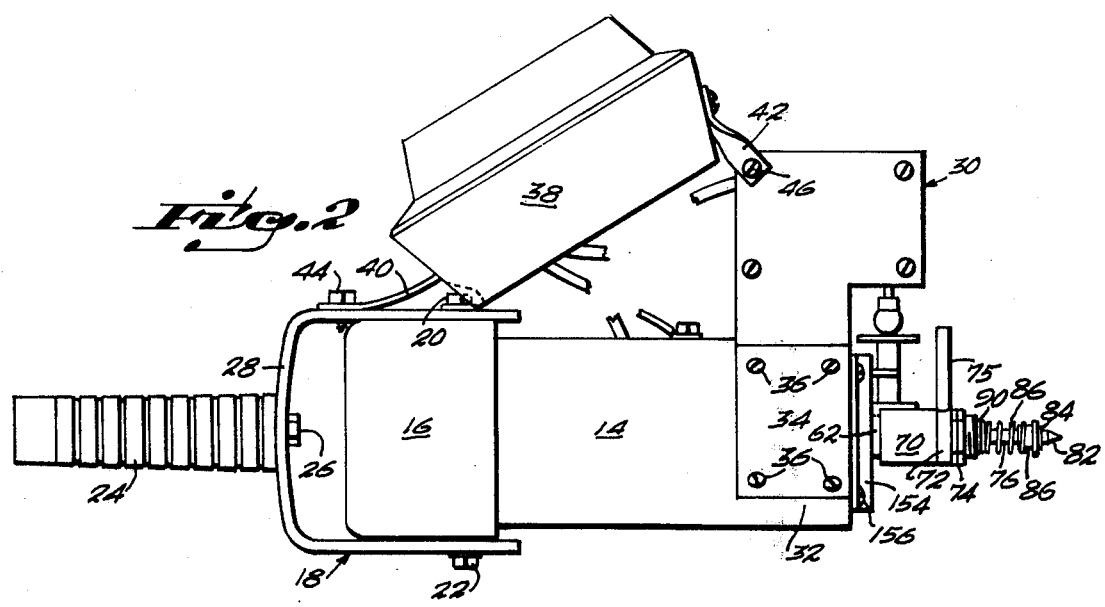
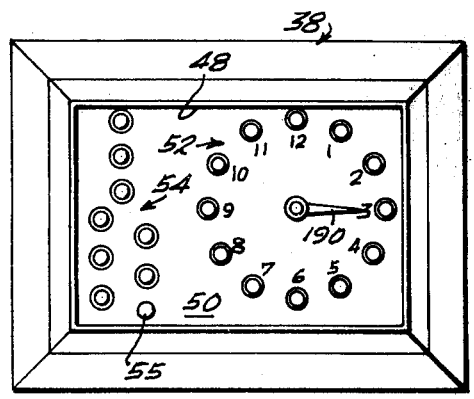

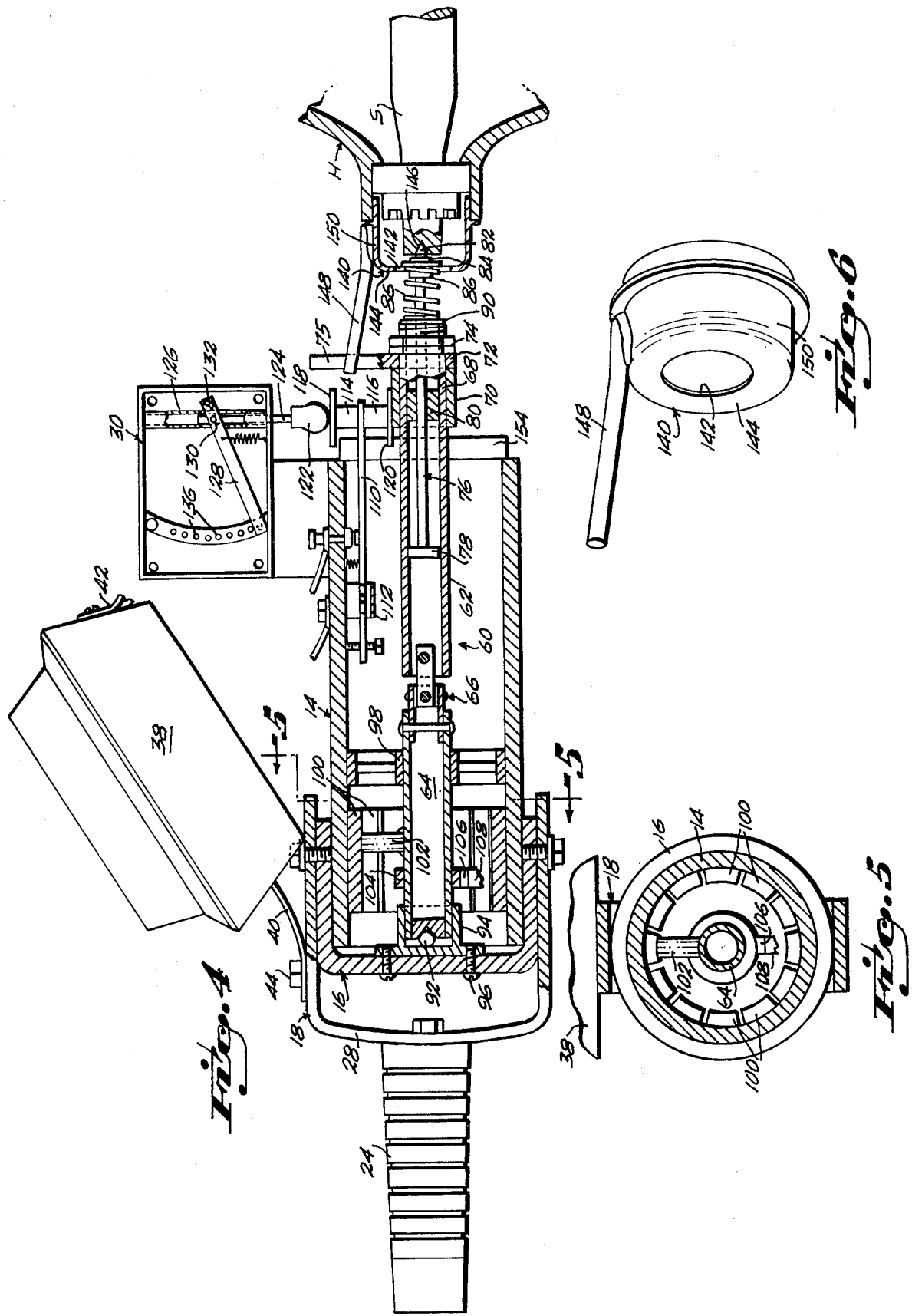

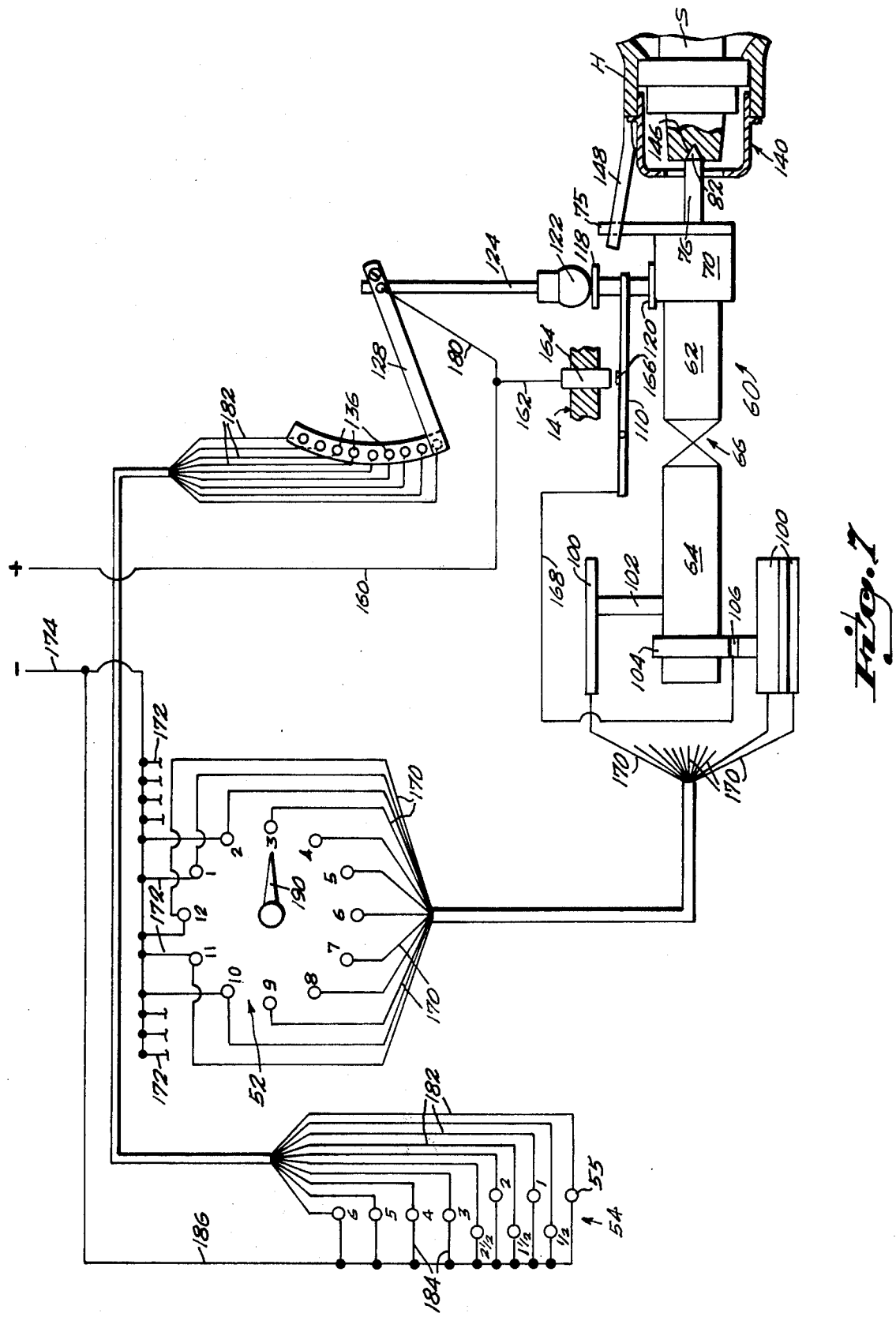

BALANCING DEVICE FOR VEHICLE WHEELS

BACKGROUND OF THE INVENTION:

The present invention pertains to a wheel balancing device and more particularly to a device of this nature which is adapted to balance a wheel while it is mounted on a vehicle.

Sustained high speeds on modern, smooth highways have increased the demand for fine, accurate wheel balancing. The new performance, wide profile and radial ply tires require precise static and dynamic balance to eliminate troublesome vibrations of the vehicle.

Older types of wheel balancing devices require the wheel and tire assembly to be removed from the vehicle prior to balancing. This type of device has the disadvantage of requiring dismounting of the wheel from the vehicle and remounting thereof after the balancing operation, necessitating additional time and labor.

Newer types of wheel balancing devices are adapted to balance a wheel while it is mounted on the vehicle. One type of on-the-wheel balancer includes a disc-like mechanism clamped to the wheel. This device is operable to dispose weight at selective locations about the tire and thus to direct the placement by the operator of permanent weights to the locations indicated, once the optimum location and amount of weight required is determined. The disadvantages of this type of balancer are that a plurality of clamps are required to adapt the disc mechanism to the various sizes of conventional wheels and the possibility that the discs may be secured to the wheel "off-center" and result in an inaccurate balance.

Another type of on-the-wheel balancer device includes a strobe lamp synchronized to conform to the RPM's of the rotating wheel by a probe disposed under and in engagement with the A-frame of the vehicle. The inherent disadvantages with this type of balancer is the need for a probe, the inconvenience of adjusting the probe under the suspended wheel to engage the A-frame, and the inability to accurately adjust the strobe to conform to the RPM's of the wheel when the wheel is nearly in balance.

The wheel balancing device of this invention is adapted to overcome all of the hereinbefore known and above-described disadvantages in addition to providing a faster, more accurate and cheaper device and method of balancing a wheel mounted on a vehicle.

OBJECTS OF THE PRESENT INVENTION:

One of the principal objects of the present invention is to provide an improved wheel balancing device for balancing a vehicle mounted wheel.

Another principal object of this invention is to provide a wheel balancing device which is generally hand-held in operation and which provides dial means for visual observation of indicator means for the correct placement of weight on the wheel and the correct amount of weight to be applied.

A further object of this invention is to provide a first group of lights to indicate the correct placement of weight and a second group of lights to indicate the correct amount of weight.

It is yet another object of this invention to provide centering means for the device relative to the wheel spindle and a rotor shaft concentric therewith which oscillates in unison with an unbalanced wheel.

It is still another object of this invention to provide a pair of switch means to react to varying degrees of oscillating movement of the rotor shaft, the first of said switch means being actuated to illuminate lights of said first group in a manner so as to visually indicate to the operator the exact location of the out-of-balance portion of the wheel; the second of said switch means is actuated to illuminate lights of said second group in a manner so as to visually indicate the exact amount of weight required to balance the wheel.

BRIEF DESCRIPTION OF THE DRAWINGS:

FIG. 1 is a perspective view of the wheel balancing device of the present invention in use on a vehicle mounted wheel;

FIG. 2 is a side elevational view of the device of FIG. 1;

FIG. 3 is a face view of the light indicator dial of the balancing device;

FIG. 4 is an enlarged longitudinal sectional view of the balancing device applied to a wheel spindle and hub;

FIG. 5 is a vertical cross sectional view taken along line 5—5 of FIG. 4;

FIG. 6 is a perspective view of an adaptor which replaces the conventional dust cap on the wheel hub; and FIG. 7 is a combination electrical and mechanical schematic view of the wheel balancing device of the present invention.

DETAILED DESCRIPTION OF THE DRAWINGS:

With reference to the drawings in which like reference characters designate like or corresponding parts throughout the various views and with particular reference to FIG. 1, the wheel balancing device of the present invention is designated generally at 10 in a position in which it would normally be hand-held in engagement with a wheel W of a vehicle V.

The wheel W to be balanced is elevated from the support surface by any conventional jack means (not shown) and a conventional wheel turner 12 is employed to turn the wheel W to be balanced at a high rate of speed.

With particular reference to FIG. 2, the balancing device 10 of the present invention is comprised generally of a main tubular housing 14 with a rear end closure cap 16. A vertically disposed, rearwardly extending yoke bracket 18 is bolted as at 20 and 22 to cap 16 and a rearwardly extending handle 24 is bolted at 26 to the base web 28 of the bracket 18.

A switch box 30 is fixed to and extends vertically upwardly from the front end portion 32 of the tubular housing 14 by bracket means 34 screwed or bolted at 36 to said front end portion 32. An observation box 38 is fixed between the yoke bracket 18 and the switch box 30 by brackets 40 and 42, fixed in place by screws 44 and 46. As best illustrated in FIG. 3, the top of box 38 is open as at 48 for operator viewing of a dial plate 50. A first group of twelve indicator lights 52 in clock formation and preferably numbered one through twelve, and a second group of nine lights 54 are displayed on the dial plate 50. The second group of lights 54 include a single light 55, preferably green, to indicate that the device is "on" and ready for operation. The balance of group 54 are preferably marked by numbers indicating various weight requirements of the wheel balancing operation, generally graded upwardly from one-half ounce as seen in FIG. 7.

With reference to FIG. 4, a rotor shaft 60 extends axially through the interior length of the tubular housing 14 and includes forward and rear, axially aligned portions 62 and 64 connected by a universal joint 66 of any conventional type. The forward shaft portion 62 is tubular in form and extends a predetermined distance forwardly, outwardly of the open front end as at 68. A collar 70 is securely fixed to end 68 and a collar 72 is securely engaged against the outer end of collar 70 as by a pair of lock nuts 74 threaded onto the distal end portion of shaft portion 62. The collar 72 includes a radially extending pin 75 fixed thereto.

Shaft portion 62 is tubular in form and a probe member 76 is axially, slidably engaged therein by means of a headed inner end 78 and a bushing 80 within the shaft portion 62. A forwardly, outwardly extending portion of probe 76 terminates in a conical tip end 82. An annular flange 84 is formed integral with the probe just rearwardly of conical end 82 to limit the forward movement of a flanged sleeve 86. A compression spring 88 is engaged between the flanged sleeve 86 and a washer 90 engaged against the forward face of the tubular shaft 62.

The inner rotor shaft portion 64 is axially journaled within the rear end portion of housing 14 by means of an end thrust bearing 92 and sleeve 94 fixed as at 96 to the end closure 16, and a forward bushing 98 fixed within housing 14. A series of rotor plates 100, twelve as illustrated, are circumferentially spaced about the inner wall of the housing 14 in positions to be sequentially engaged by an electric current carrying brush 102, carried by shaft portion 64. Electric current is conducted to shaft portion 64 by means of a conductor ring 104, fixed thereto and engaged by a brush 106, carried by bracket means 108, fixed within the housing in any conventional manner. Operation of the twelve rotor plates relative to the twelve indicator lights 52 will be subsequently described relative to FIG. 7.

A lever arm 110 is pivotally carried, adjacent its inner end, by a bracket 112 within the housing 14. The lever arm 110 extend forwardly, outwardly of the open end of housing 14, and generally vertical extensions 114 and 116 are affixed thereto, terminating in head portions 118 and 120, above and below the lever arm. Lower head portion 120 normally bears against collar 70 in operation, and upper head portion 118 is engaged by an enlarged lower end 122 of a rod 124 extending vertically upwardly into the switch box 30. The rod 124 is slidably engaged in a tube 126, vertically fixed within switch box 30, and a conductor switch arm 128 within box 30 is pivotally attached at 130 to the upper end portion of rod 124. A first, short end of arm 128 is pivoted at 132 to the switch box 30 and a second, long end thereof is swingable about pivot 132, upon upward and downward movement of rod 124 to sequentially engage a plurality of arcuately spaced apart contacts 136 to complete circuits in a corresponding sequential order to the second group of dial lights 54.

An adaptor 140, FIGS. 4, 6 and 7 is engaged on a wheel hub H after the conventional dust cover has been removed therefrom. A hole 142 is provided in the vertical face 144 thereof to permit access to an axial conical hole 146 provided in the end of all wheel spindles S. A generally outwardly extending pin 148 is fixed as by welding to the outer annular wall 150 of the adaptor 140.

The adaptor 140 may be modified in a variety of ways to fit front and rear wheel hubs of different makes and models of vehicles, however, all forms of the adaptor provide access to the conical spindle hole 146 and include an outward projection such as pin 148 to engage the pin 75 for a purpose to be hereinafter described.

Referring to FIG. 7, in use, the wheel to be balanced is jacked up, the hub cap and dust cover are removed, the adaptor 140 is engaged on the hub H and the wheel is turned at a high rate of speed by a wheel turning device 12 as in FIG. 1. The conical probe tip 82 is centered in the conical spindle hole as in FIG. 7 and pressure is manually exerted against the device until the pin 75 fixed to the rotor shaft 60 engages the adaptor pin 148. The rapid rotational movement of the wheel W is imparted to the rotor shaft 60 and the outer portion 62 thereof is pivotal in a generally vertical direction by means of universal joint 66, lateral pivotal movement thereof being restricted by a pin of vertical side rods such as 154 fixed as at 156 to the front end of housing 14.

The oscillating movement of an out-of-balance wheel is confined to a vertical or up and down movement. The upward oscillating movement occurs in a 90 degree segment as from 3:00 o'clock to 12:00 o'clock.

Positive electric leads 160 and 162 connect with a fixed contact 164. When the upward oscillating movement of the spindle S is transmitted to the probe 76 the collar 70 engages the head portion 120, moves it upwardly and pivots the lever arm 110 upwardly in a manner so as to engage a contact 166 on arm 110 with fixed contact 164. A circuit is then completed through lever arm 110, lead 168, brush 106, conductor ring 104, rotor shaft portion 64 and brush 102 to one of the twelve rotor plates 100.

Only three of the twelve rotor plates are illustrated in FIG. 7 for the sake of clarity of illustration, however, a positive lead such as 170 connects with each one of the clock formation lights 52, numbered one through twelve. As seen in FIG. 5, the twelve rotor plates 100 are positioned in one to twelve o'clock positions and are electrically connected by leads 170 to like positioned lights 52. Each light 52 is provided with a negative lead 172 (only four shown completed for clarity of illustration) to complete a circuit to the main negative lead 174.

Therefore, with each upward oscillation, the contacts 164 and 166 are engaged to complete a circuit and illuminate one or more of the lights 52. In most instances two or three lights will be illuminated, the final one to be illuminated indicating the heavy point on the wheel. For example, if the heavy point is indicated at three o'clock on the dial, it may be the last of two or three lights to be sequentially illuminated. When the aligning device is removed from the wheel, the wheel W is manually rotated until the adaptor pin 148 is located at a three o'clock position. The heavy point on the wheel will then be at twelve o'clock and the light point to be weighted will be at six o'clock. When the wheel is manually rotated to the position of any numbered light indication, the light or unbalanced point on the wheel will always be at six o'clock.

The upper lever head 118 will contact the lower end 122 of rod 124 to cause upward movement thereof upon each upward oscillation of the rotor shaft portion 62. This movement causes the switch arm 128 to pivot upwardly to sequentially engage the arcuately disposed group of contacts 136 to sequentially complete circuits to corresponding lights in group 54. The circuits are completed through a positive lead 180, switch arm 128, contacts 136 and a plurality of leads 182 connecting between corresponding contacts 136 and lights 54. The circuits are completed by negative leads such as 184 from each light 54 to a common lead 186.

The lights 54 as seen in FIG. 7 are identified by weight requirements in ounces. In operation, the last light to become illuminated will give the highest weight indication which is the required weight for the wheel. In its "at rest" position the switch arm 128 completes a circuit to the green light 55. The knob controlled pointer 190 is manually operable to record the out-of-balance location.

It will be obvious that the number of indicator lights in one or both groups 52 and 54 may be varied and that a variety of structural changes can be made in the device without departing from the true spirit of the invention as defined in the appended claims.

What is claimed is:

1. A device for balancing a wheel assembly mounted on a vehcile comprising,
  A. a main housing defining an interior chamber and having an open front end;
  B. a rotor shaft extending axially through said chamber and providing,
    1. a back portion rotatably journaled in said chamber, and
    2. a tubular front portion with a universal joint connection to said back portion;
  C. probe means slidably journaled in said tubular front portion and including an extended outer end portion for centered engagement with the outer end of the wheel spindle to receive up and down oscillating movement of an out-of-balance wheel;
  D. means to drivingly engage the wheel to said rotor shaft to rotate said rotor shaft in unison with the wheel when the wheel is rotated and the probe means is engaged with the wheel spindle;
  E. means to transmit upwardly oscillating movement of said front portion, received from said wheel spindle by said probe means, to a first switch means;
  F. a first dial means comprised of a first plurality of lights to visually indicate the location of the out-of-balance condition on the wheel when the wheel is rotated;
  G. a first electric circuit means, activated by said first switch means to illuminate at least one of said first plurality of lights which visually indicates the location of the maximum out-of-balance on the wheel;
  H. a second dial means comprised of a second plurality of lights to visually indicate the amount of weight necessary to bring the wheel into balance;
  I. a second switch means activated by the oscillating movement of said first position to energize a second electric circuit means to illuminate the light of said second plurality which indicates the needed amount to weight to achieve a balanced condition of the wheel.

2. The device as defined in claim 1 wherein said extended outer end portion of said probe terminates in a conical tip end.

3. The device as defined in claim 2 including a compression spring circumposed about said extended outer end portion between the outer end face of said front tubular portion and a sliding collar normally constrained against movement by an annular flange adjacent said conical tip end by the forces of said compression spring.

4. The device as defined in claim 3 including an adaptor fixed relative to the extended central end of the wheel hub, replacing the conventional dust cap, said adaptor including a through hole positioned to permit passage therethrough of said probe means for said centered engagement.

5. The device as defined in claim 4 wherein said means to drivingly engage comprises a generally outwardly extending projection from said adaptor to drivingly engage a generally radially extending projection, fixed relative to said rotor shaft to impart rotational movement of the wheel to said rotor shaft.

6. The device as defined in claim 1 wherein said first plurality of lights comprises twelve lights disposed in clock formation and numbered one through twelve.

7. The device as defined in claim 6 wherein said first switch means comprises a lever arm pivotally mounted within said interior chamber, said lever arm being formed of an electric current conductive material and including a contact portion, and a fixed contact, fixed relative to said main housing for contact by said lever arm contact.

8. The device as defined in claim 7 wherein said means to transmit comprises a downwardly extending projection from an outwardly extended end of said lever arm for contact with and movement by said front portion to complete said first electric circuit means through the contacts of said first switch means each time an unbalanced wheel condition causes the wheel to oscillate upwardly.

9. The device as defined in claim 8 wherein said first electric circuit means includes a plurality of rotor plates, one for each of said first plurality of lights, in a spaced apart, fixed relation to the inner portion of said chamber wall, a conductor ring, fixed about said second rotor shaft portion, a first brush, engaged with said conductor ring and a second brush fixed to said second rotor shaft portion in electric communication between said conductor ring and said plurality of rotor plates in a sequential order as said rotor shaft rotates.

10. The device as defined in claim 9 wherein said first electric circuit means includes a first electric lead from a source of supply to said first switch means and a second electric lead from said pivotal conductor arm to said first brush.

11. The device as defined in claim 10 including an electric lead from each of said rotor plates to a correspondingly positioned light of said first plurality of lights, and a negative lead from each of said first plurality back to said source.

12. The device as defined in claim 8 including an upward projection from said outwardly extending lever arm end in contact with a slide rod pivotally connected intermediate the length of a pivoted conductor arm in a manner so as to swing said conductor arm into sequential engagement with any number of a plurality of spaced apart, arcuately disposed contacts when said second rotor shaft portion oscillates upwardly, the degree of oscillation determines degree of conductor arm movement; said pivoted conductor arm and arcuately disposed contacts comprises said second switch means.

13. The device as defined in claim 12 wherein said second circuit means comprises an electric lead from the source of supply to said conductor arm, an electric lead from each of said arcuately disposed contacts to a corresponding one of said second plurality of lights, and a negative lead from each of said second plurality back to said source.

14. The device as defined in claim 1 including a horizontally, outwardly extending handle means fixed to the back end of the device.

15. The device as defined in claim 1 including a manually operated pointer rotatably journaled centrally of said first plurality of lights.

16. For inclusion in a device for balancing a wheel assembly mounted on a vehicle comprising:
- a. a main housing defining an interior chamber and having an open front end,
- b. a shaft extending axially through said chamber and providing,
  1. a back portion rotatably supported in said chamber, and
  2. a tubular front portion with a universal joint connection to said back portion, the improvement comprising:

probe means slidably journaled in said tubular front portion and including an extending outer end portion for centered engagement with the outer end of the wheel spindle to receive up and down oscillating movement of an out-of-balance wheel, means to transmit upwardly oscillating movement of said first portion, received from said wheel spindle by said probe means, an electric circuit and including means to sense movement of the probe means, said means to sense being operatively connected to said means to transmit and said electric circuit including first indicator means to visually indicate an out-of-balance condition of the wheel when the wheel is rotated and a second indicator means to indicate the amount of weight necessary to bring the wheel into balance.

* * * * *